United States Patent
Liu et al.

(10) Patent No.: US 11,126,351 B2
(45) Date of Patent: Sep. 21, 2021

(54) POLICY-BASED MANAGEMENT OF DISK STORAGE FOR CONSUMER STORGE BUCKETS

(71) Applicant: salesforce.com, inc., San Francisco, CA (US)

(72) Inventors: Ted Liu, Los Altos, CA (US); Karthik Mohan Subramanian, Sunnyvale, CA (US); Youngjin Yu, Cupertino, CA (US); Yeshwant Sai Madanagopal, Fremont, CA (US); Chris Hoang, San Jose, CA (US); Rajiv Yeddu, San Ramon, CA (US); Donald Martin, Montgomery, TX (US); Sunny Lal, Hayward, CA (US); Hoang Nguyen, Fairfax, VA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/738,923

(22) Filed: Jan. 9, 2020

(65) Prior Publication Data

US 2021/0216206 A1 Jul. 15, 2021

(51) Int. Cl.
*G06F 13/00* (2006.01)
*G06F 3/06* (2006.01)
*G06F 11/30* (2006.01)
*G06F 11/34* (2006.01)

(52) U.S. Cl.
CPC ............ *G06F 3/0604* (2013.01); *G06F 3/067* (2013.01); *G06F 3/0659* (2013.01); *G06F 11/3034* (2013.01); *G06F 11/3452* (2013.01)

(58) Field of Classification Search
CPC ...... G06F 3/0604; G06F 3/067; G06F 3/0659; G06F 11/3452; G06F 11/3034
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

A Technical Overview of New Features for Automatic Storage Management in Oracle Database 19c, Oracle White Paper,17 pages, published Feb. 2019.https://www.oracle.com/technetwork/database/database-technologies/cloud-storage/asm/overview/asm-new-features-5303288.pdf.

(Continued)

*Primary Examiner* — Jing-Yih Shyu
(74) *Attorney, Agent, or Firm* — Jaffery Watson Mendonsa & Hamilton LLP

(57) ABSTRACT

In a cloud computing environment, a storage space management system provides for uniform collection of usage statistics for storage disks and storage consumers, including usage statistics for a consumers' storage buckets, where a storage bucket represents a logical container of files, objects or other types of stored data for a given consumer. The system enables automated evaluation of space usage policy against the collected statistics. The system enforces the evaluated policy determinations, including queueing jobs that manage storage disk eligibility for storing data and jobs that direct traffic from storage consumers to storage disks that have sufficient storage available.

25 Claims, 13 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,832,248 B1 * | 12/2004 | Byrnes .................. H04L 29/06 707/999.001 |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,438,618 B1 * | 9/2016 | Sultan ................ H04L 63/1433 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0125891 A1 * | 5/2010 | Baskaran ............... H04L 9/3263 726/1 |
| 2010/0146269 A1 * | 6/2010 | Baskaran ................ G06F 21/10 713/165 |
| 2016/0283274 A1 * | 9/2016 | Kochunni ............. G06F 9/5022 |
| 2016/0344596 A1 * | 11/2016 | Holden ............... H04L 67/1097 |
| 2020/0044943 A1 * | 2/2020 | Bor-Yaliniz ........ H04L 41/5067 |

OTHER PUBLICATIONS

Dell EMC Data Domain® Operating System 6.1 Administration Guide, Chapter 6 MTrees, pp. 199-214, published Feb. 2019.https://www.dellemc.com/en-us/collaterals/unauth/technical-guides-support-information/products/networking-4/docu85190.pdf.

* cited by examiner

POLICY-BASED MANAGEMENT OF DISK STORAGE FOR CONSUMER STORGE BUCKETS

TECHNICAL FIELD

Embodiments of the invention relate generally to the field of computer data storage, and more particularly, to managing storage space in data storage systems.

BACKGROUND

Modern software for enterprise computing is often provided as a service in a scalable, on-demand cloud computing environment, commonly referred to as software as a service (SaaS) hosted on a platform as a service (PaaS).

The PaaS is typically provided using cloud computing. Cloud computing is an information technology paradigm for enabling ubiquitous access to shared pools of configurable resources (such as computer networks, servers, data storage, applications and services). The configurable resources are designed to be rapidly provisioned with minimal management effort, often over the Internet. Cloud computing allows users and enterprises with various computing capabilities to store and process data either in a privately-owned cloud, or on third-party servers located in data centers, thus making data-accessing mechanisms more efficient and reliable.

The servers and other data storage resources of cloud computing often store large amounts of data in distributed databases. A distributed database can be an organized collection of information that is dispersed over a network of interconnected computers such as a cloud computing network. The servers and other data storage resources of the cloud computing network can include disk storage servers in which storage is allocated to and used by users and enterprises, collectively referred to as disk storage consumers.

The storage allocated to disk storage consumers can be logically organized into storage buckets, where the buckets are logical containers for a group of files or objects that may or may not be related to one another. In order to insure continuous high availability of the servers and other data storage resources of a cloud computing network, a PaaS provider must provide disk storage consumers with sufficient space to store their storage buckets.

BRIEF DESCRIPTION OF THE DRAWINGS

The included drawings, by way of example only and not limitation, illustrate possible structures and operations for implementing the disclosed inventive systems, apparatus, methods, and computer-readable storage media. The drawings do not limit any changes in form and detail that may be made by one skilled in the art consistent with the spirit and scope of the disclosed implementations.

DETAILED DESCRIPTION

Figure 1:
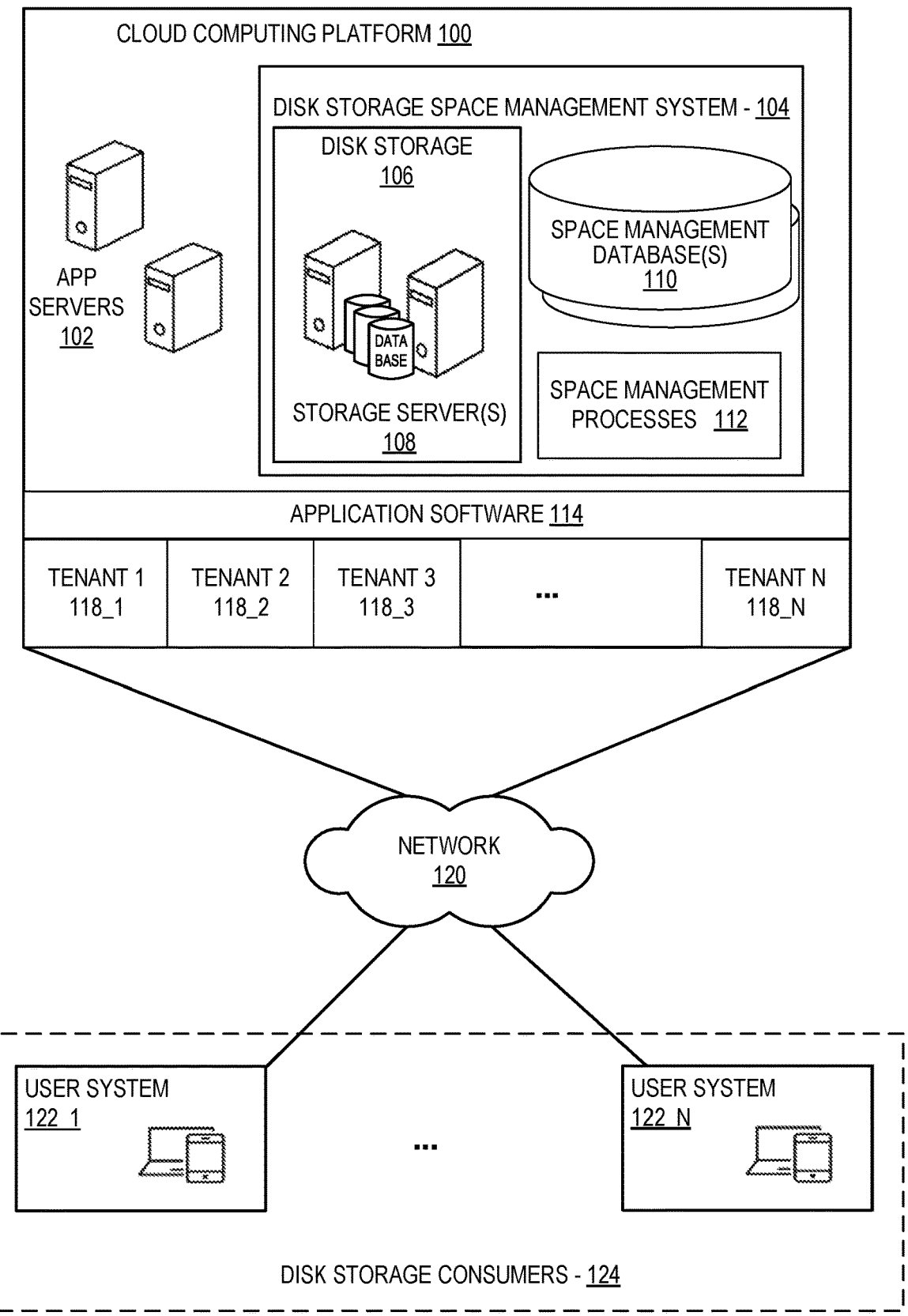
FIG. 1 is a block diagram overview of a system for disk storage space management in a cloud computing platform according to one embodiment.

Current storage space management methods rely on proprietary database software, such as Oracle's space management features, and/or data protection software for protecting the integrity of storage disks and the data contained therein, such as the Dell EMC® Data Domain (DD) data deduplication storage system technology. Maintaining a fleet of disk storage servers can involve a number of manual steps and calculations to maintain an appropriate amount of available space in the fleet. The amount of storage space that is used and the storage space that is available can be continuously changing. For example, in addition to writing new files or data objects, the files or data objects can have limited shelf life and be purged periodically.

For example, in a data center that uses the Dell EMC® DD data deduplication storage system technology to protect and reduce the amount of storage required to store data, a data center administrator uses a DD management catalog to track Mtrees, the logical partitions of a file system. The administrator uses the catalog to capture the DD name, Mtree name, and the local compression (LC) statistics at various time intervals. The captured information can be used to determine whether the purging and compression associated with expired data and/or the DD deduplication process is yielding sufficient space (e.g., in terabytes TB) so that the file data can stay in the current DD, or whether it should be moved to another DD where more space is available. Accessing the DD management catalog to maintain a fleet of storage servers in this manner can be cumbersome and time consuming. In a storage environment in which space usage needs to be separately monitored for multiple storage consumers, the existing space management options may not provide sufficient granularity.

To address this challenge, a disk storage space management system includes processes to manage disk storage space in a uniform manner based on one or more usage statistics collected for the storage disks as well as for the storage consumers. In one embodiment, a disk storage space management system maintains an inventory of disk storage servers. The system collects usage statistics for the disk storage servers as well as for the disk storage consumers based on the number of and/or the various characteristics of a consumer's storage buckets. The disk storage space management system can be configured to work with a number of different database and data storage systems that comprise the fleet of disk storage servers, including various proprietary database and data storage systems.

In one embodiment, a disk storage space management system collects usage statistics for usage of disk storage space provided to the disk storage consumers. The system periodically or on demand evaluates the collected usage statistics against a policy. The policy includes one or more thresholds or other criteria against which to evaluate the collected statistics. The system enforces the policy through jobs queued to a job management queue to manage the disk storage space in response to evaluating the usage statistics against the policy.

In one embodiment, the jobs include any one or more of a modification to write traffic originating from a disk storage consumer to one or more of the disk storage servers, and a space management request to any one or more of the disk storage servers and disk storage consumers, the space management request including a request to any one or more of create, move, write, remove and modify a consumer storage bucket maintained on behalf of a disk storage consumer in one or more of the disk storage servers.

FIG. 1 illustrates an example cloud computing platform 100 in which embodiments of a disk storage space management system can be implemented. Cloud computing platform 100 can include various application servers 102 and a disk storage space management system 104 for managing space in a data storage PaaS. The disk storage space management system 104 manages space provided by disk storage 106 comprising storage server(s) 108, also referred to herein as storage nodes, to support databases and other types of file or object storage, including storage buckets, all of which are connected via a network 120. During operation of cloud computing platform 100, different combinations of application servers 102, disk storage 106, and storage server(s) 108 can execute various types of application software 114 and access one or more databases, files, objects, and storage buckets, etc. any of which can be stored in one or more of the storage server(s) 108.

In one embodiment, the disk storage space management system 104 manages space using special purpose repositories for storing space management data, such as space management databases 110. The database storage system 104 further includes several space management processes 112 that contain the logic for implementing the space management system.

User systems 122_1 to 122_N typically connect to application servers 102, disk storage space management system 104 and disk storage 106 through a network 120. Network 120 includes internal networks (not shown), local area networks (LANs), wide area networks (WANs), privately or publicly switched telephone networks (PSTNs), wireless (Wi-Fi) networks, cellular or mobile telecommunications networks, and any other similar networks, or any combination thereof. Cloud computing platform 100 and user systems 122_1 to 122_N can operate within a private enterprise network, within a publicly accessible web-based network, such as via the Internet, or within any combination of networks.

User systems 122_1 to 122_N can include personal computers (PCs), including workstations, laptop or notebook computers, tablet computers, handheld computing devices, cellular or mobile phones, smartphones, terminals, or any other device capable of accessing network 120 and cloud computing platform 100. User systems 122_1 to 122_N can use different protocols to communicate with cloud computing platform 100 over network 120, such as Transmission Control Protocol and Internet Protocol (TCP/IP), Hypertext Transfer Protocol (HTTP), and/or File Transfer Protocol (FTP), to name a few non-limiting examples. In one example, user systems 122_1 to 122_N can operate web browsers or applications that can send and receive HTTP messages to and from an HTTP server operating in cloud computing platform 100. User systems 122_1 to 122_N can each be one or more disk storage consumers 124 of space on the storage server(s) 108 comprising the disk storage 106.

Cloud computing platform 100 in conjunction with application software 114 and disk storage space management system 104 can provide an almost limitless variety of different services to support different types of business enterprise needs. For example, the aforementioned SaaS and PaaS services to support various business enterprise applications, such as customer relationship management (CRM), enterprise resource planning (ERP), file sharing, web-based commerce or e-commerce, social networking, cloud-based computing and/or storage, any other similar service, or any combination thereof. Cloud computing platform 100 and/or network 120 can be alternatively referred to as a cluster, cloud, and/or cloud-based computing system.

In one embodiment, application software 114 can interoperate with a third-party vendor of a database storage system 104, such as Amazon® Web Services, Google® Cloud Service and Microsoft® Azure Cloud to support different types of business enterprise needs. The disk storage space management system 104 is typically operated on one or more networked physical data centers that provide the data storage hardware infrastructure, i.e., the disk storage 106 and storage server(s) 108. The vendors of the data storage hardware infrastructure can vary from one data center to another.

In one example, cloud computing platform 100, application software 114 and disk storage space management system 104 can operate as a multi-tenant system (MTS). A multi-tenant system refers to a database system where different hardware and software can be shared by one or more organizations represented as tenants (118_1, 118_2, 118_3, . . . 118_N; collectively "tenants 118"). For example, cloud computing platform 100 can associate a first tenant 118_1 with an organization that sells airline services, associate a second tenant 118_2 with an organization that sells widgets, and associate a third tenant 118_3 with an organization that sells medical administration services. The multi-tenant system can effectively operate as multiple virtual databases each associated with one of tenants 118.

In one embodiment, the application servers 102, disk storage 106 and storage server(s) 108 can be organized into pods (not shown) that include groups of application servers 102, storage servers 108 and associated databases that share an instance of the multi-tenant system. Different pods can operate independently but can share some processing and infrastructure equipment, such as routers (not shown) and storage area networks (SANs) (not shown). For example, tenants 118_2 and 118_3 can operate within one pod and a user associated with tenant 118_3 can use user system 122_1 to access the multi-tenant system operating in a same or different pod.

In one embodiment, user system 122_1 can send requests from the user to a load balancer (not shown). In response, the load balancer can forward the requests to one of the application servers 102. Application server 102 can service the requests by executing application software 114, including processing requests that involve transactions through third-party application software and/or accessing disk storage 106 serving data from storage servers 108 within a storage cluster, or pod, or from elsewhere as needed.

Cloud computing platform 100 can include, for example, hundreds of storage servers 108 in disk storage 106, and a database administrator can assign thousands of tenants 118 to disk storage 106, including to a shared storage cluster. A database administrator can add or modify disk storage 106 for servicing additional tenants 118 and/or can reassign any of tenants 118 to different storage server(s) 108 or storage clusters managed by the disk storage space management system 104. For example, one of tenants 118 can use a relatively large amount of processing bandwidth and/or use a relatively large amount of storage space. The database administrator can reassign that tenant, e.g., 118_2, to a storage server 108 with more processing bandwidth and/or storage capacity than the server in an originally assigned cluster. Thus, the multi-tenant system can scale for practically any number of tenants and users.

Figure 2:
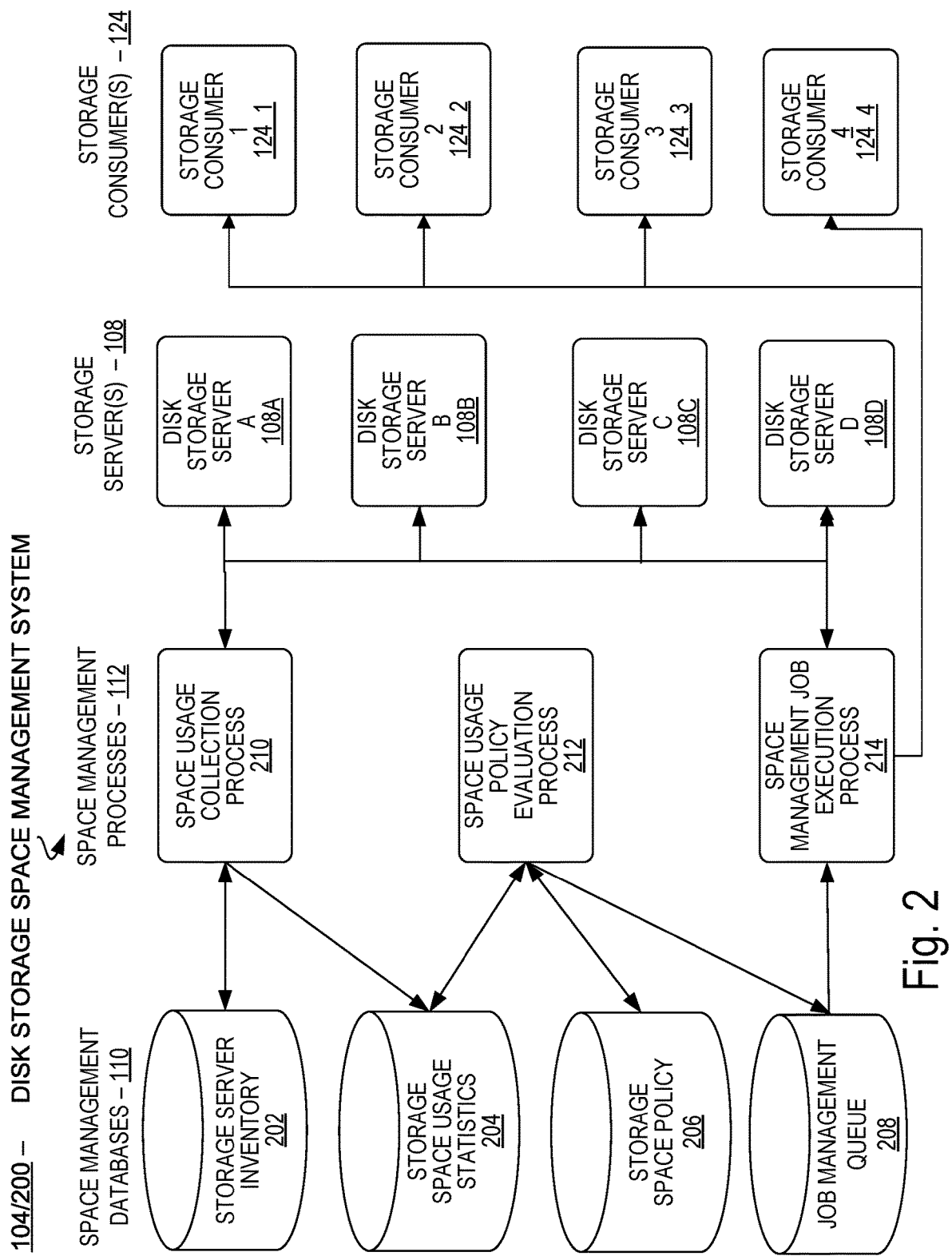
FIG. 2 is a block diagram of additional details of a disk storage space management system in a cloud computing platform according to one embodiment.

FIG. 2 illustrates additional details of an embodiment of a disk storage space management system 104/200 as might be implemented in the cloud computing environment 100 described in FIG. 1. In one embodiment, the disk storage space management system 200 comprises space management databases 110, space management processes 112 and storage server(s) 108. The space management databases 110 function as repositories for a storage server inventory 202 to identify and track the storage servers 108, a storage space usage statistics repository 204 in which to collect one or more usage statistics periodically or on demand for each of the storage servers 108, a storage space policy 206 containing criteria for evaluating the collected usage statistics for the storage servers 108. Lastly, the space management databases 110 include a job management queue 208 in which to queue jobs for enforcing the storage space policy 206 in response to evaluating the collected usage statistics. In one embodiment, the disk storage space management databases 110 can instead or in addition include tables or other data structures for storing and accessing the information for supporting the disk storage space management system 200.

In one embodiment, the disk storage space management system 200 includes several space management processes 112, including a space usage collection process 210 to collect various statistics about a storage server 108 and/or disk storage consumers 124, including statistics about the storage buckets stored by the disk storage consumers 124 on the storage servers 108. The disk storage space management system 200 further includes a space usage policy evaluation process 212 to evaluate the collected usage statistics against the storage space policy 206, and a space management job execution process 214 in which execute space management jobs queued in response to the policy evaluation process 212. In one embodiment, the space management job execution process 214 directs a requested action to a particular disk storage server 108, e.g. storage server A 108A, storage server B 108B, and so forth. In addition, or in the alternative, the space management job execution process 214 directs a requested action to a storage consumer 124, such as storage consumer 1, 124_1, storage consumer 2, 124_2 and so forth.

In one embodiment, the space management databases 110 and space management processes 112 interoperate to automate space management jobs for managing space on one or more server(s) 108 in which the disk storage consumers 124 store their storage buckets. In one embodiment, an application server 102 manages the disk storage 106 and storage servers 108 as well as disk storage consumers 124 in communication with any of the space management databases 110 and space management processes 112.

Figure 3:
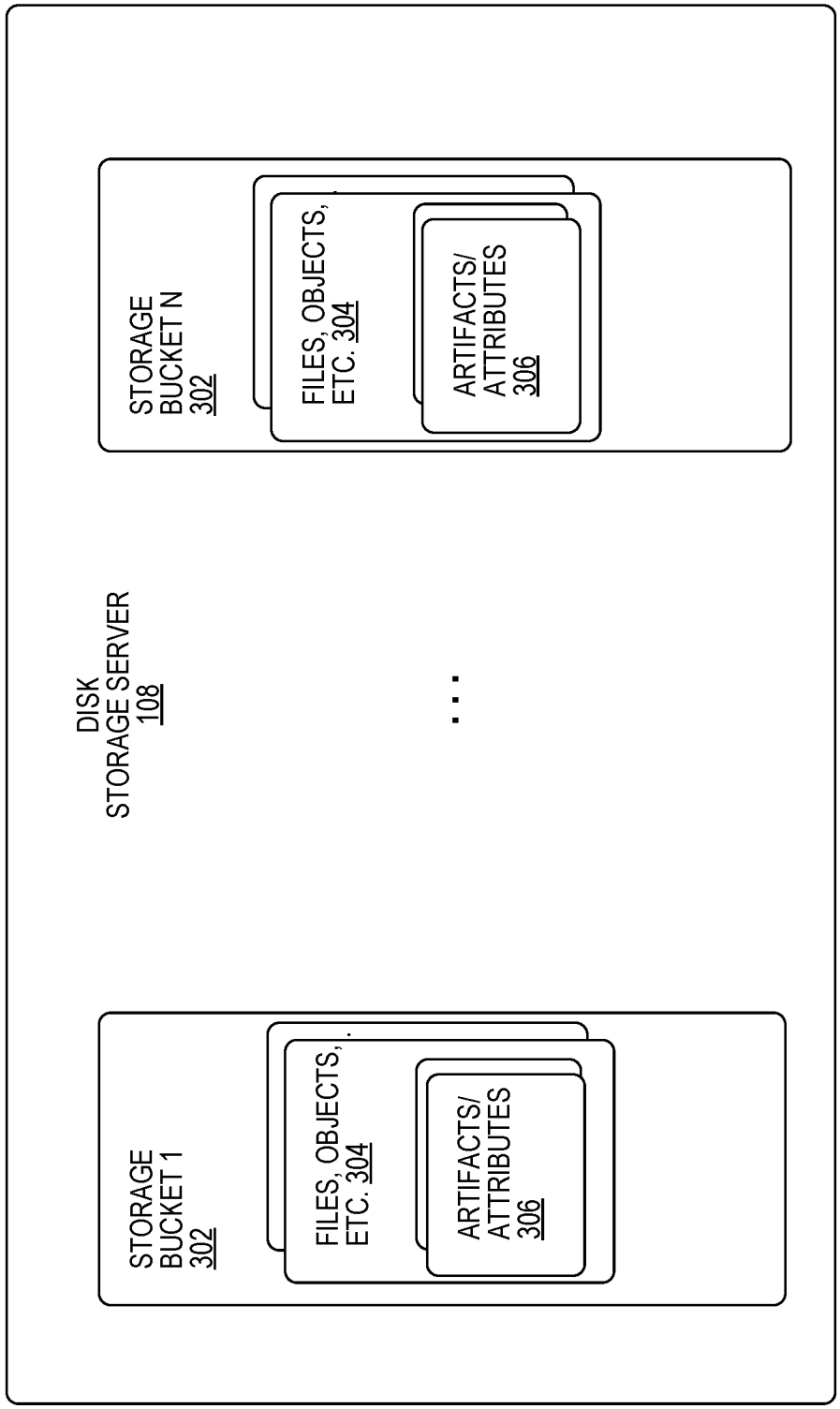
FIG. 3 is a block diagram of additional details of a disk storage server for a disk storage space management system in a cloud computing platform according to one embodiment.

FIG. 3 illustrates a block diagram of selected components of a disk storage server 108 in which the space is being managed. In one embodiment, a disk storage server 108 can contain one or more storage buckets 302 that serves as a container for any one or more files, objects, etc. 304, each of which can be associated with one or more artifacts and/or attributes 306 that can affect the amount of storage on the storage server 108 that the storage bucket consumes.

Figure 4:
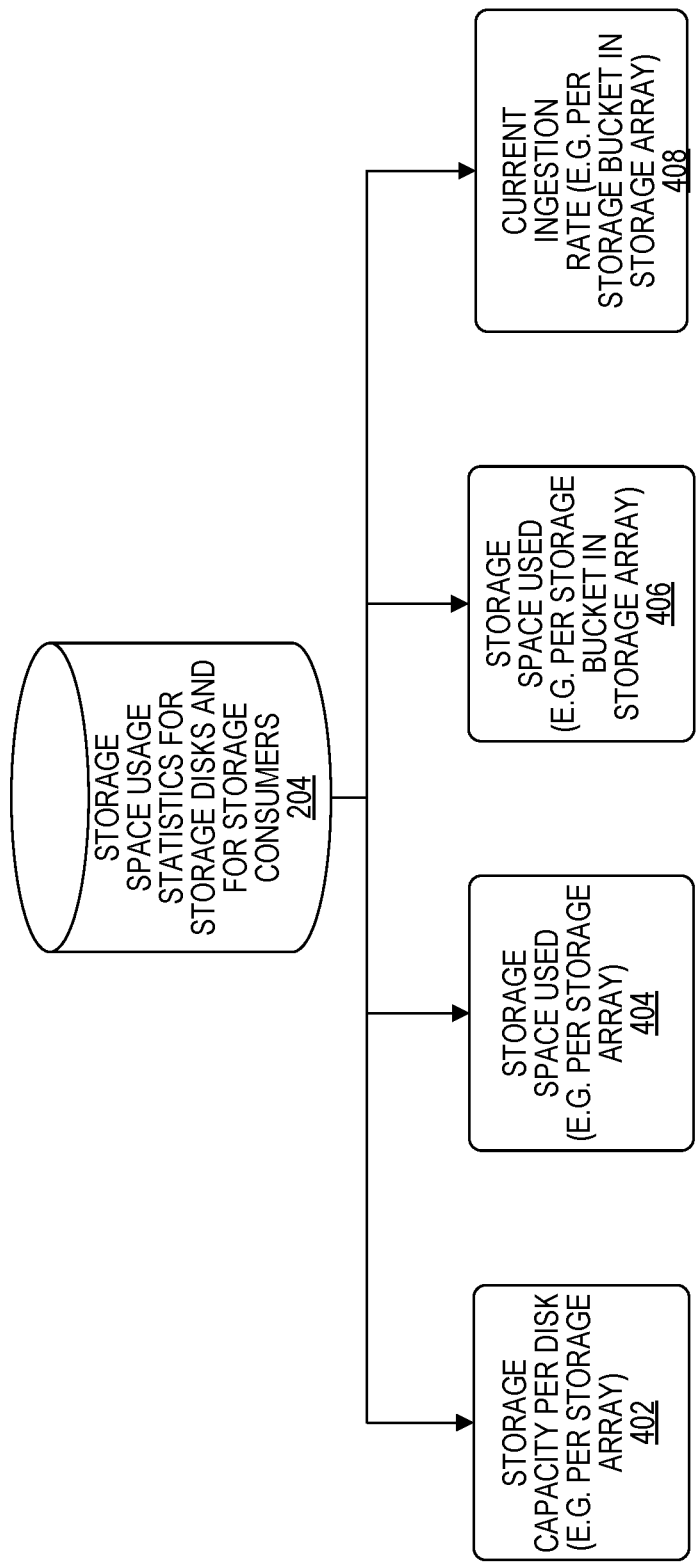
FIG. 4 is a block diagram of additional details of storage space usage statistics collected for a disk storage space management system in a cloud computing platform according to one embodiment.

FIG. 4 illustrates a block diagram of selected components of the storage space usage statistics for storage disks and storage consumers 204. In one embodiment, the usage statistics include a storage capacity per disk, e.g. per storage array, 402, a storage space used statistic, e.g. per storage array 404, another more granular storage space used statistic, e.g., per storage bucket in a storage array, 406, and a current ingestion rate, e.g. the amount of space consumed by a storage bucket over time, per storage bucket in a storage array, 408.

Figure 5:
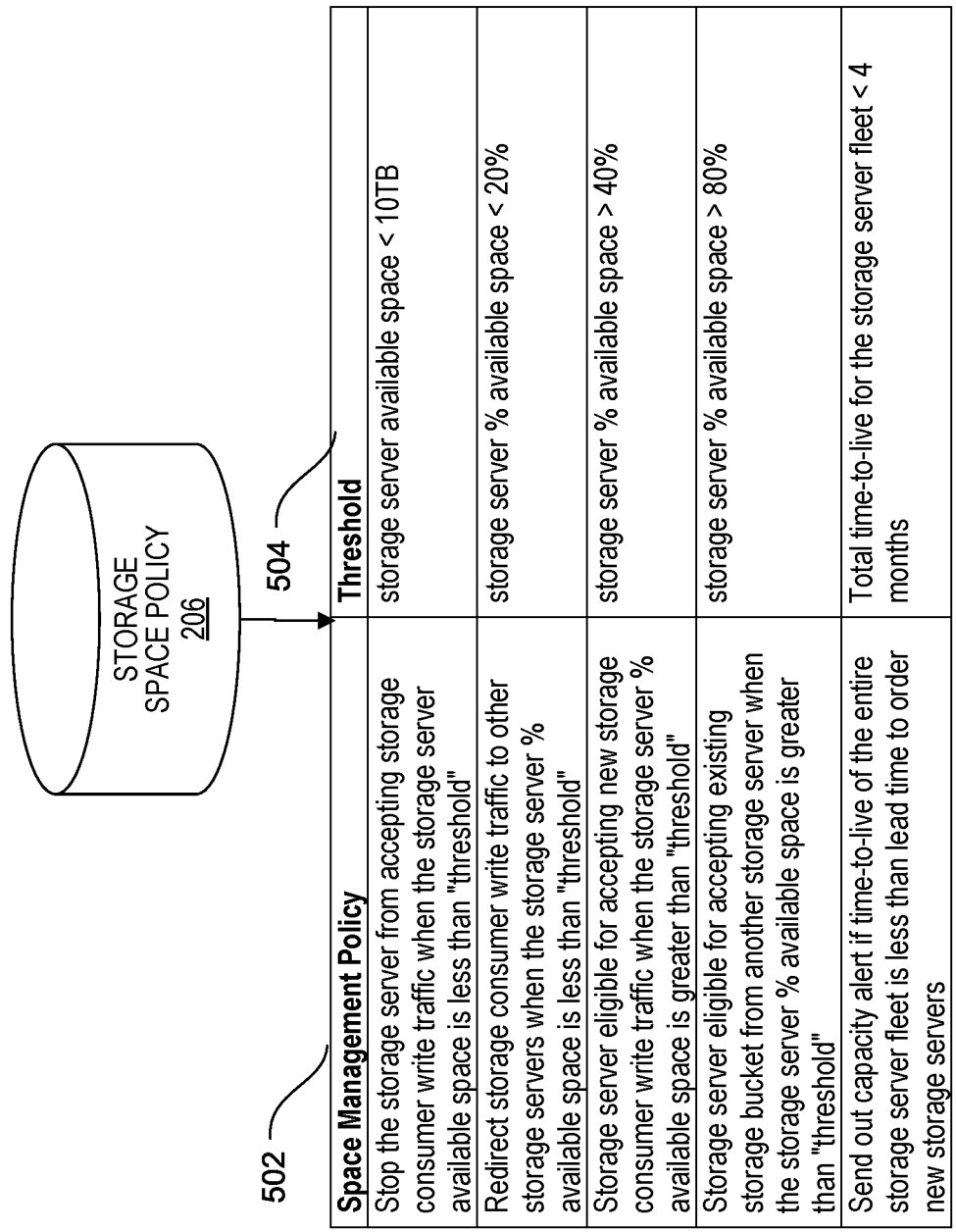
FIG. 5 is a block diagram of additional details of a storage space policy for a disk storage space management system in a cloud computing platform according to one embodiment.

FIG. 5 illustrates a block diagram of example space management policies 502 and associated threshold criteria 504 that can be stored in the storage space policy repository 206. For example, the space management policy can ensure that the storage server is stopped from accepting storage consumer write traffic with the storage server's available space is less than the current configured threshold, in this case less than 10 TB (terabytes). As illustrated, the space management policies 502 and threshold criteria 504 can vary in degree and in kind, and the examples listed in the policy chart in FIG. 5 are to be understood as examples only for purposes of illustration, since other types of policies can be implemented in accordance with embodiments of a disk storage space management system 104.

With reference to the illustrated examples of policy 502 and threshold 504, one criteria can include the total time-to-live for a storage server fleet under which an alert is generated in order to provide sufficient time to order and swap out new storage server infrastructure. As another example, the threshold criteria 504 can include disk storage space thresholds for available space in a storage server above which threshold the server is evaluated as having too little capacity to accommodate any increases in the size or amount of consumer storage buckets. As another example, the threshold criteria 504 can include disk storage consumer thresholds for an amount of space in one or more storage servers above which threshold a consumer's storage buckets must be relocated or modified to ensure that sufficient space is available to accommodate them. In other examples, the threshold criteria 504 can include time thresholds to facilitate a determination of whether the disk storage space threshold and disk storage consumer threshold will be exceeded within a time threshold at a current rate of ingestion associated with the consumer storage buckets and/or an amount of space consumed by artifacts and other data associated with the consumer storage buckets. Other types of storage space policy 206 can be implemented in a disk storage space management system 104 besides the examples illustrated in the chart of policies 502 and thresholds 504 of FIG. 5.

Figure 6:
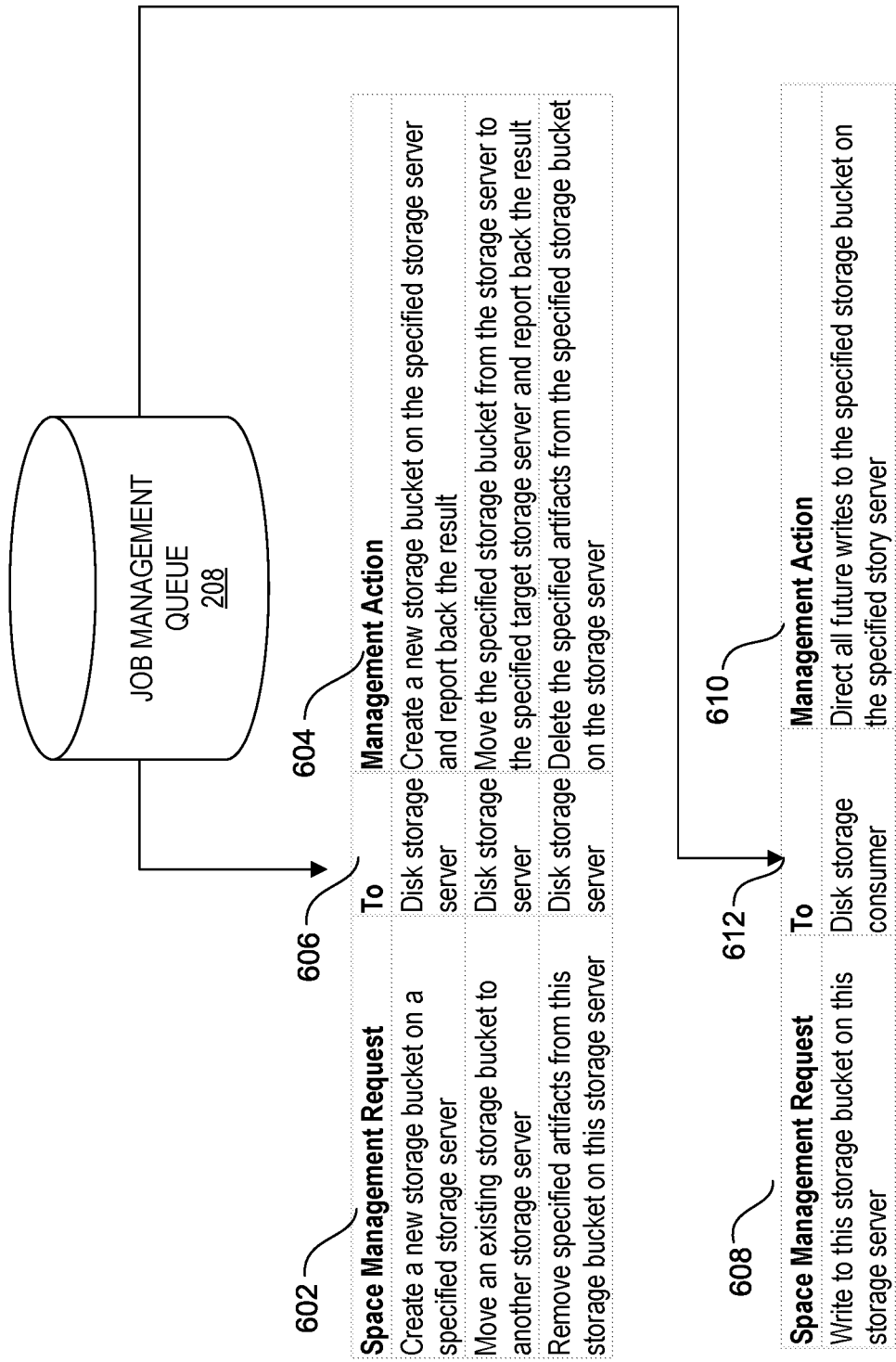
FIG. 6 is a block diagram of additional details of a job management queue for a disk storage space management system in a cloud computing platform according to one embodiment.

FIG. 6 illustrates a block diagram of a job management queue 208 example jobs, where the jobs include a space management request 602, and space management action 604 and an identity of inventoried disk storage server 606 against which the space management request 602 should be enforced. In one embodiment, the jobs include a space management request 608 and corresponding space management action 610 that is directed to a disk storage consumer 612 for the purpose of causing the disk storage consumer to redirect its consumer storage traffic to a specified storage bucket stored on a specified storage server. It should be understood that jobs comprising a space management request 602/608, a "TO" destination 606/612 and a management action 604/610 other than the illustrated examples in FIG. 6 can be implemented in embodiments of a disk storage space management system 104.

Figure 7:
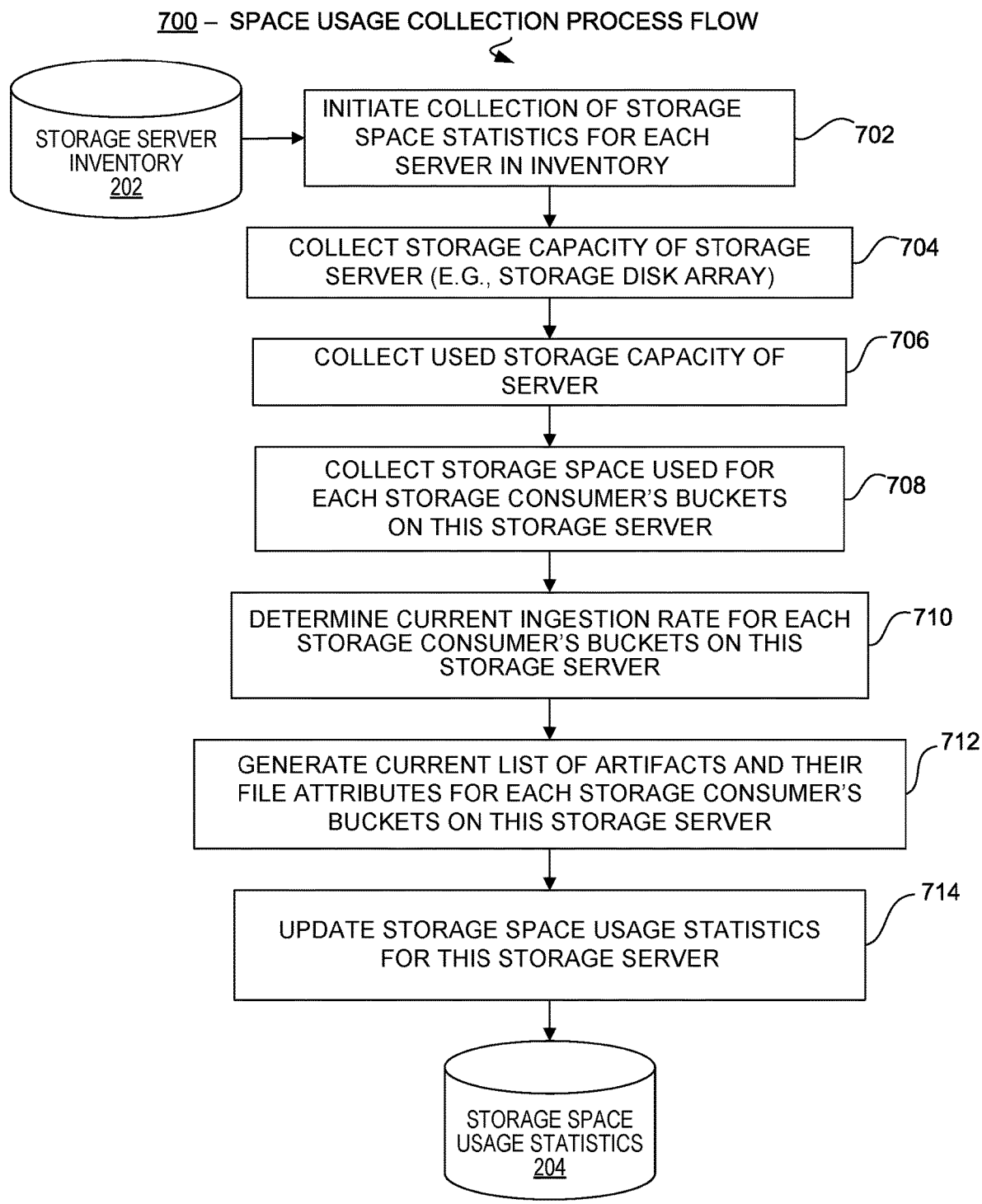
FIGS. 7, 8A-8B and 9 are flow diagrams of processes for a disk storage space management system in a cloud computing platform according to one embodiment.

FIG. 7 illustrates a flow diagram for an embodiment of a space usage collection process 700 for a disk storage space management system 200 in a cloud computing platform 100 according to one embodiment. The process 700 begins at 702 by initiating the collection of storage space statistics for each server in the storage server inventory 202, either periodically or on demand. At 704, the process 700 collects the storage capacity of a storage server, e.g., a storage disk array. At 706, the process 700 collects the used storage capacity of a storage server, and at 708, the process 700 collects storage space used for each storage consumer's buckets on this storage server. In one embodiment, at 710, the process determines a current ingestion rate for each storage consumer's storage buckets on this storage server based, for example, on the amount of increased storage usage statistics since the last time the statistics were collected. At process 712, the process 700 generates a current list of artifacts and their file attributes for each storage consumer's storage buckets on this storage server. Lastly, at 714, the process updates the storage space usage statistics collected, determined and/or generated for this storage server on the storage space usage statistics repository 204.

Figure 8A:
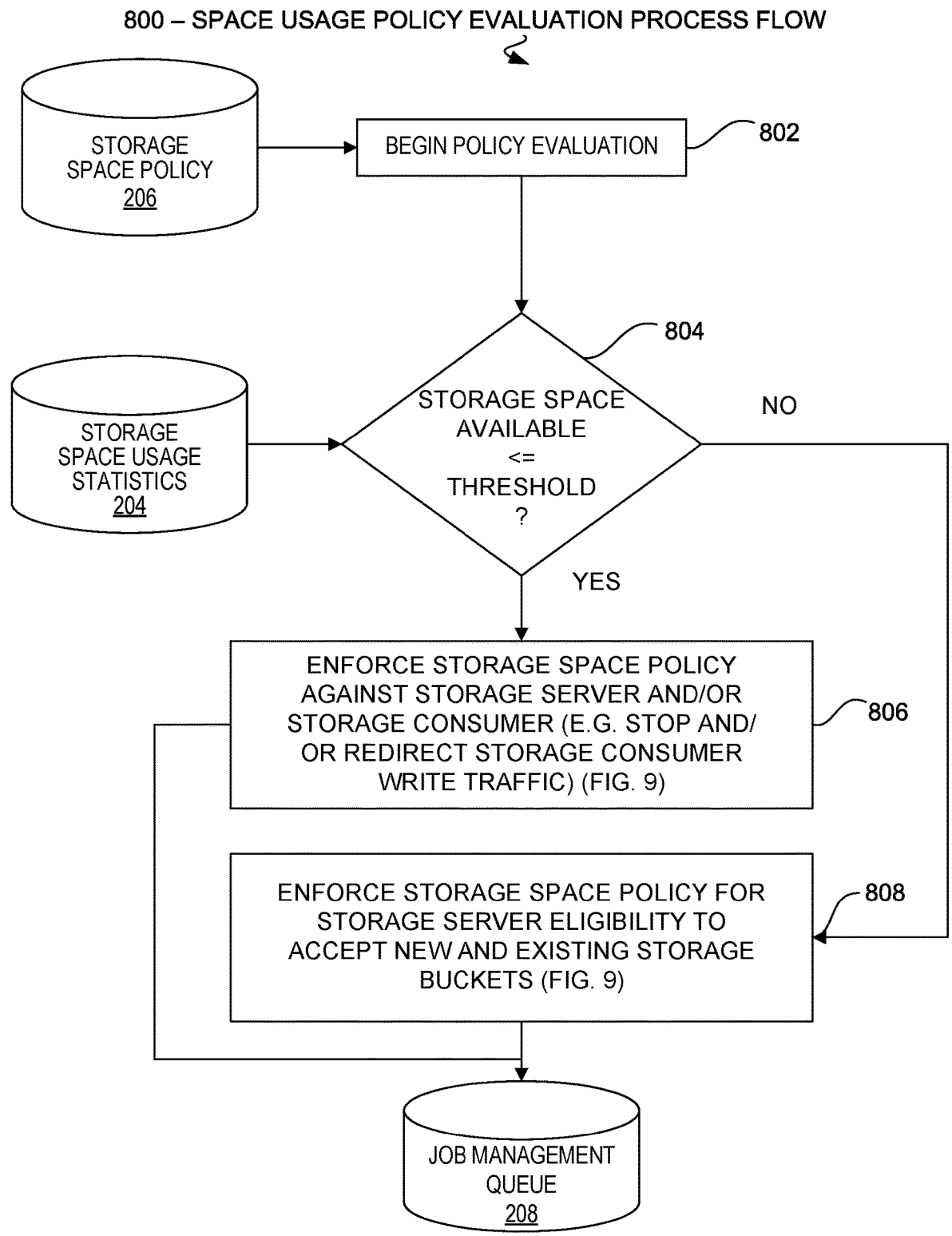
Figure 8B:
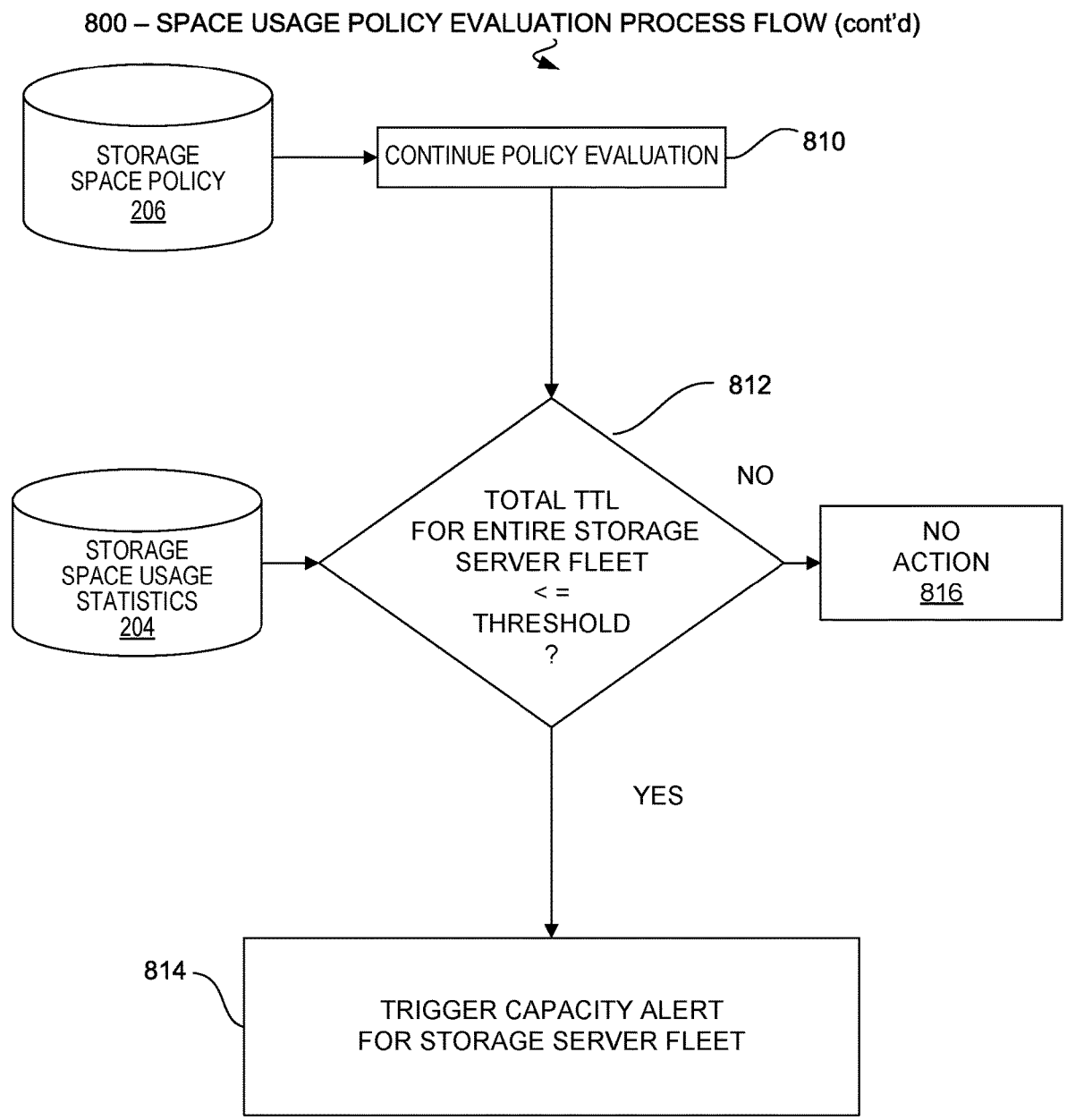

FIGS. 8A-8B illustrate flow diagrams for an embodiment of a space usage policy evaluation process 800 for a space management system 200 in a cloud computing platform 100 according to one embodiment. In one embodiment, at 802, the process 800 begins the policy evaluation using the storage space policy 206. The process 800 determines at 804 whether the available storage space statistic collected in the storage space usage statistics repository 204 is less than or equal to a current threshold criteria specified in the storage space policy 206. If so then the process 800, at 806, enforces the storage space policy against the storage server and/or the storage consumer to ensure that the storage consumer has sufficient storage space. For example, the process 800 can stop and/or redirect storage consumer write traffic to a different storage server consistent with the storage space policy 206. If the threshold criteria are not met at decision 804, then the process 800 can enforce storage space policy for the storage server's eligibility to accept new and existing storage buckets. For example, a storage server that has plenty of available space can be made eligible to receive consumer storage buckets that would otherwise have been stored elsewhere. For either process 806 and 808, the enforcement of the policy can be implemented by queueing to a job management queue 208 an appropriate job directed to a specified storage server and/or storage consumer as described in FIG. 9.

In one embodiment, as illustrated in FIG. 8B, the process 800 continues at 810, to determine at 812 whether a total time-to-live (TTL) based on TTL statistics collected for the entire fleet of storage servers is less than or equal to a threshold criteria for the TTL. If the TTL is less than the threshold criteria, then at 814, the process triggers a capacity alert for the storage server fleet to alert the data center administrator to replace the storage server fleet in sufficient time to prevent an interruption of storage services to the storage consumers. If the TTL is not less than the threshold criteria, the process 800 takes no action 816, but continues to monitor the TTL statistics.

Figure 9:
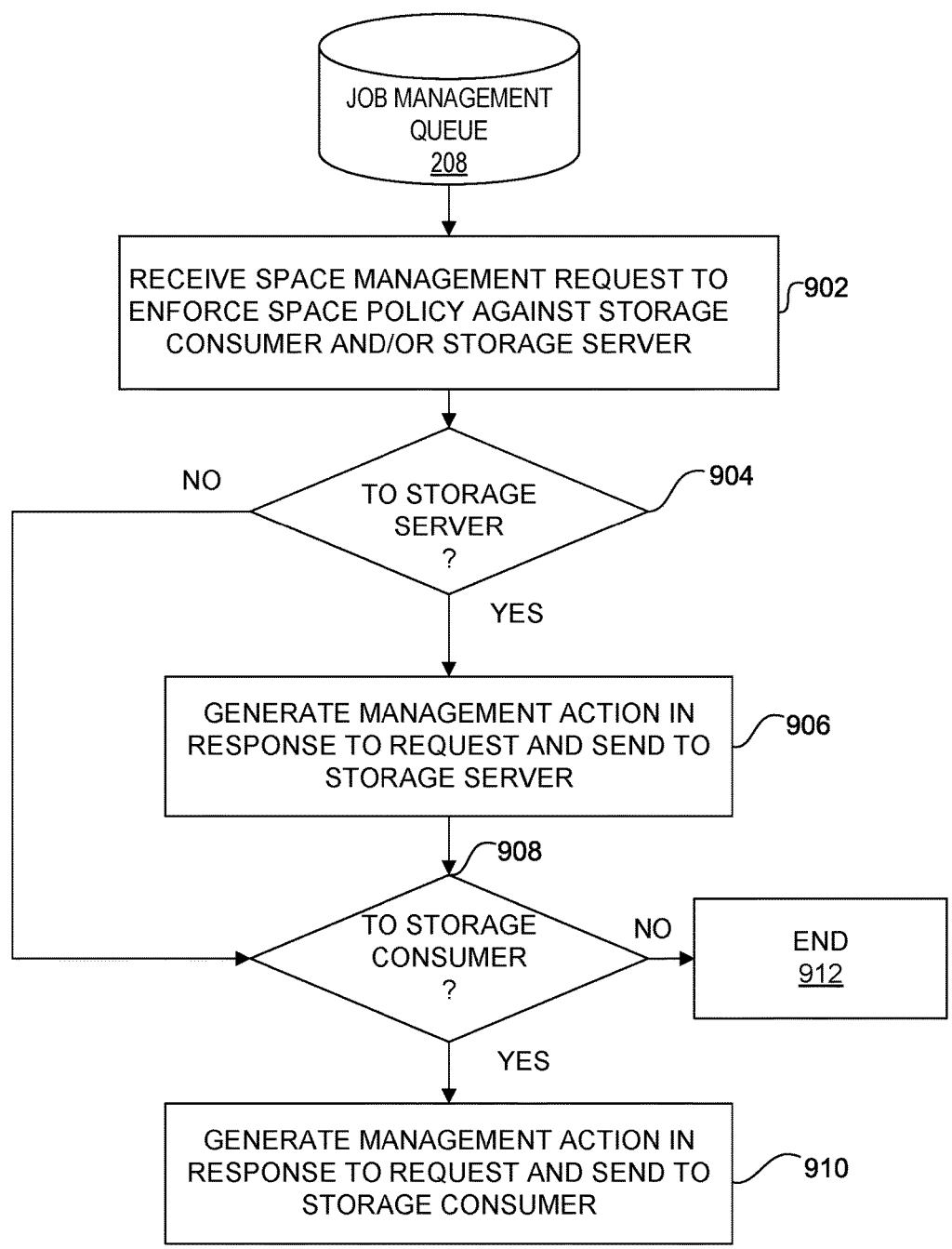

FIG. 9 illustrates a flow diagram for an embodiment of a space management job execution process 900 for a space management system 200 in a cloud computing platform 100 according to one embodiment. At 902, the process 900 receives a space management request to enforce space policy against storage consumer and/or storage server. If at 904 the process determines the space management request is directed to the storage server then at 906 the process generates an appropriate management action in response to the request, sends it to the specified storage server, and continues processing for possible actions for the storage consumer. If, however, at 904 the process determines that the request is not directed to the storage server, then the process 900 instead determines at 908 whether the space management request is only directed to a storage consumer. If so, then the process 900 generates an appropriate management action in response to the request at 910 and sends it to the specified storage consumer, and otherwise takes no further action 912.

Figure 10A:
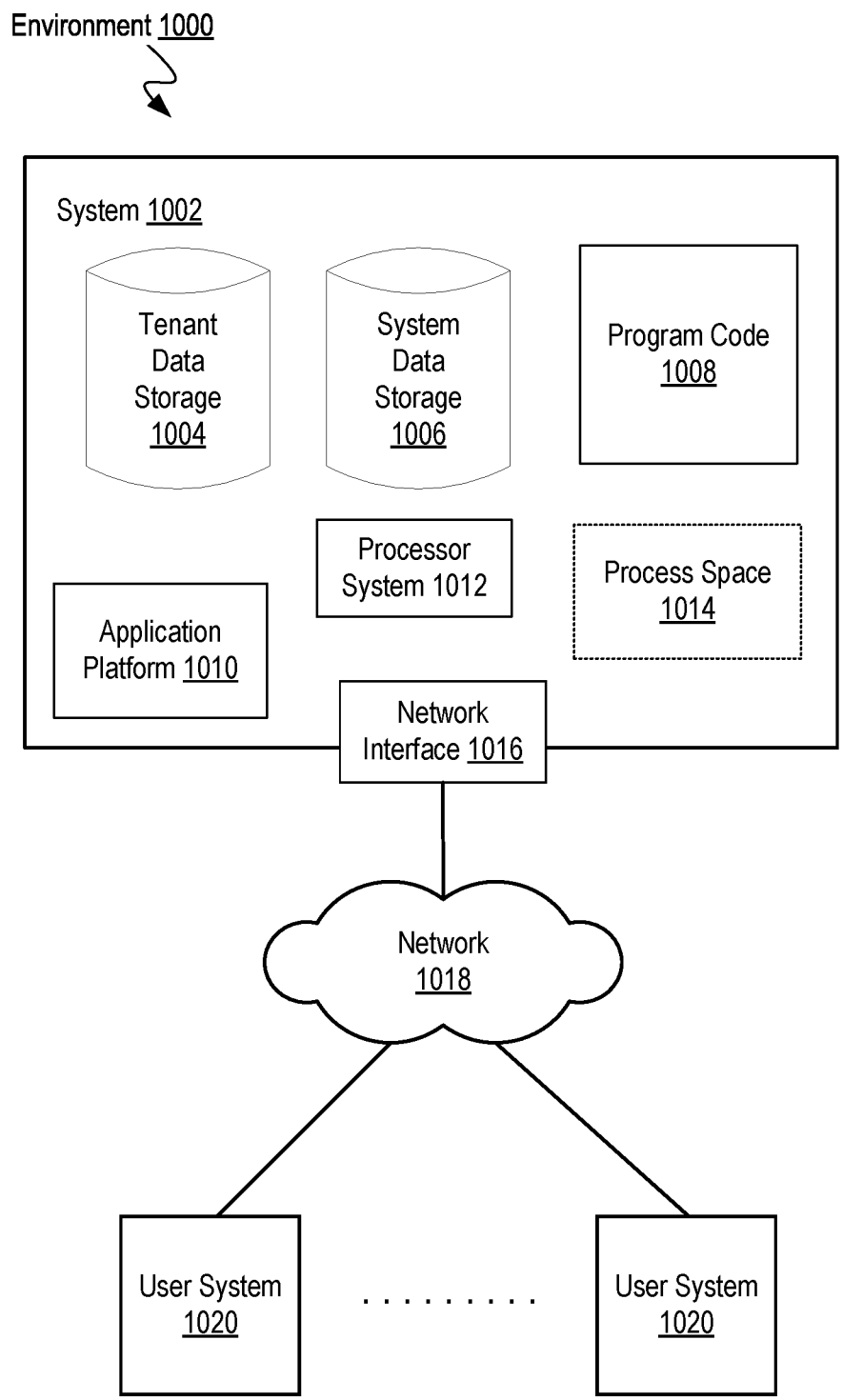
FIGS. 10A-10B are block diagrams illustrating an overview of a cloud computing environment within which one or more implementations of a disk storage space management system can be carried out.

FIG. 10A illustrates a block diagram of an environment 1000 in which an on-demand database service supported with a disk storage space management system 200 can be implemented in accordance with the described embodiments. Environment 1000 may include user systems 1020, network 1018, system 1002, processor system 1012, application platform 1010, network interface 1016, tenant data storage 1004, system data storage 1006, program code 1008, and process space 1014. In other embodiments, environment 1000 may not have all the components listed and/or may have other elements instead of, or in addition to, those listed above.

Environment 1000 is an environment in which an on-demand database service exists. User system 1020 may be any machine or system that is used by a user to access a database user system. For example, any of user systems 1020 can be a handheld computing device, a mobile phone, a laptop computer, a workstation, and/or a network of computing devices. As illustrated in FIG. 10A (and in more detail in FIG. 10B) user systems 1020 might interact via a network 1018 with an on-demand database service, which is system 1002.

An on-demand database service, such as system 1002, is a database system that is made available as a PaaS to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1002" and "system 1002" is used interchangeably herein. A database image may include one or more database objects. A relational database management system (RDMS) or the equivalent may execute storage and retrieval of information against the database object(s). Application platform 1010 may be a framework that allows the applications of system 1002 to run, such as the hardware and/or software, e.g., the operating system. In an embodiment, on-demand database service 1002 may include an application platform 1010 that enables creation, managing and executing one or more applications developed by the provider of the on-demand database service, users accessing the on-demand database service via user systems 1020, or third party application developers accessing the on-demand database service via user systems 1020.

The users of user systems 1020 may differ in their respective capacities, and the capacity of a user system 1020 might be entirely determined by permissions (permission levels) for the current user. For example, where a salesperson is using a user system 1020 to interact with system 1002, that user system has the capacities allotted to that salesperson. However, while an administrator is using that user system to interact with system 1002, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1018 is any network or combination of networks of devices that communicate with one another. For example, network 1018 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1020 might communicate with system 1002 using TCP/IP and, at a higher network level, use other common Internet protocols to communicate, such as HTTP, FTP, AFS, WAP, etc. In an example where HTTP is used, user system 1020 might include an HTTP client commonly referred to as a "browser" for sending and receiving HTTP messages to and from an HTTP server at system 1002. Such an HTTP server might be implemented as the sole network interface between system 1002 and network 1018, but other techniques might be used as well or instead. In some implementations, the interface between system 1002 and network 1018 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1002, shown in FIG. 10A, implements a web-based customer relationship management (CRM) system. For example, in one embodiment, system 1002 includes application servers configured to implement and execute CRM software applications as well as provide related data, code, forms, webpages and other information to and from user systems 1020 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1002 implements applications other than, or in addition to, a CRM application. For example, system 1002 may provide tenant access to multiple hosted (standard and custom) applications, including a CRM application. User (or third-party developer) applications, which may or may not include CRM, may be supported by the application platform 1010, which manages creation, storage of the applications into one or more database objects and executing of the applications in a virtual machine in the process space of the system 1002.

One arrangement for elements of system 1002 is shown in FIG. 10A, including a network interface 1016, application platform 1010, tenant data storage 1004 for tenant data 1005, system data storage 1006 for system data 1007 accessible to system 1002 and possibly multiple tenants, program code 1008 for implementing various functions of system 1002, and a process space 1014 for executing MTS system processes and tenant-specific processes, such as running applications as part of an application hosting service. Additional processes that may execute on system 1002 include database indexing processes.

Several elements in the system shown in FIG. 10A include conventional, well-known elements that are explained only briefly here. For example, each user system 1020 may include a desktop personal computer, workstation, laptop, PDA, cell phone, or any wireless access protocol (WAP) enabled device or any other computing device capable of interfacing directly or indirectly to the Internet or other network connection. User system 1020 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1020 to access, process and view information, pages and applications available to it from system 1002 over network 1018. Each user system 1020 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1002 or other systems or servers. For example, the user interface device can be used to access data and applications hosted by system 1002, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 1020 and all its components are operator configurable using applications, such as a browser, including computer code run using a central processing unit such as an Intel Pentium® processor or the like. Similarly, system 1002 (and additional instances of an MTS, where more than one is present) and all of their components might be operator configurable using application(s) including computer code to run using a central processing unit such as processor system 1012, which may include an Intel Pentium® processor or the like, and/or multiple processor units.

According to one embodiment, each system 1002 is configured to provide webpages, forms, applications, data and media content to user (client) systems 1020 to support the access by user systems 1020 as tenants of system 1002. As such, system 1002 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10B:
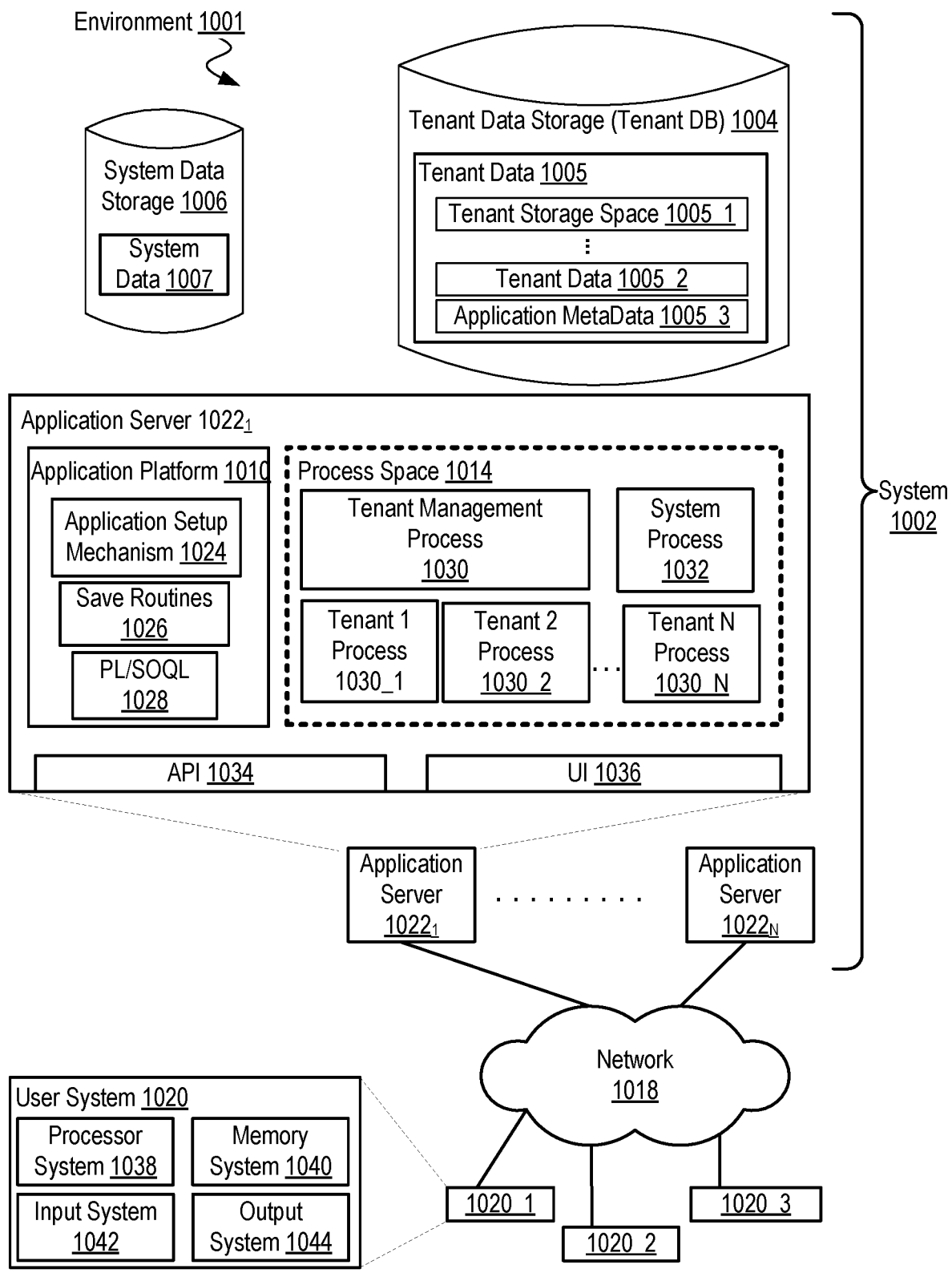

FIG. 10B illustrates another block diagram of an embodiment of elements of FIG. 10A and various possible interconnections between such elements in accordance with the described embodiments. FIG. 10B also illustrates environment 1001. However, in FIG. 10B, the elements of system 1002 and various interconnections in an embodiment are illustrated in further detail. More particularly, FIG. 10B shows that user system 1020 may include a processor system 1038, memory system 1040, input system 1042, and output system 1044. FIG. 10B shows network 1018 and system 1002. FIG. 10B also shows that system 1002 may include tenant data storage 1004, having therein tenant data 1005, which includes, for example, tenant storage space 1005_1, tenant data 1005_2, and application metadata 1005_3. System data storage 1006 is depicted as having therein system data 1007. Further depicted within the expanded detail of application servers $1022_{1-N}$ are User Interface (UI) 1036, Application Program Interface (API) 1034, application platform 1010 includes PL/SOQL 1028, save routines 1026, application setup mechanism 1024, process space 1014 includes system process space 1032, tenant 1-N process spaces 1030_1, and tenant management process space 1030. In other embodiments, environment 1001 may not have the same elements as those listed above and/or may have other elements instead of, or in addition to, those listed above.

User system 1020, network 1018, system 1002, tenant data storage 1004, and system data storage 1006 were discussed above in FIG. 10A. As shown by FIG. 10B, system 1002 may include a network interface 1016 (of FIG. 10A) implemented as a set of HTTP application servers 1022, an application platform 1010, tenant data storage 1004, and system data storage 1006. Also shown is system process space 1032, including individual tenant process spaces 1030_1 and a tenant management process space 1030. Each application server 1022 may be configured to tenant data storage 1004 and the tenant data 1005 therein, and system data storage 1006 and the system data 1007 therein to serve requests of user systems 1020. The tenant data 1005 might be divided into individual tenant storage areas (e.g., tenant storage space 1005_1), which can be either a physical arrangement and/or a logical arrangement of data. Within each tenant storage space 1005_1, tenant data 1005_2, and application metadata 1005_3 might be similarly allocated for each user. For example, a copy of a user's most recently used (MRU) items might be stored to tenant data 1005_2. Similarly, a copy of MRU items for an entire organization that is a tenant might be stored to tenant storage space 1005_1. A UI 1036 provides a user interface and an API 1034 provides an application programmer interface into system 1002 resident processes to users and/or developers at user systems 1020. The tenant data and the system data may be stored in various databases, such as one or more Oracle™ databases.

Application platform 1010 includes an application setup mechanism 1024 that supports application developers' creation and management of applications, which may be saved as metadata into tenant data storage 1004 by save routines 1026 for execution by subscribers as one or more tenant process spaces 1030_1 managed by tenant management process space 1030 for example. Invocations to such applications may be coded using PL/SOQL 1028 that provides a programming language style interface extension to API 1034. Invocations to applications may be detected by one or more system processes, which manage retrieving application metadata 1005_3 for the subscriber making the invocation and executing the metadata as an application in a virtual machine.

Each application server 1022 may be communicably coupled to database systems, e.g., having access to system data 1007 and tenant data 1005, via a different network connection. For example, one application server 10221 might be coupled via the network 1018 (e.g., the Internet), another application server 1022N-1 might be coupled via a direct network link, and another application server 1022N might be coupled by yet a different network connection. Transfer Control Protocol and Internet Protocol (TCP/IP) are typical protocols for communicating between application servers 1022 and the database system. However, it will be apparent to one skilled in the art that other transport protocols may be used to optimize the system depending on the network interconnect used.

In certain embodiments, each application server 1022 is configured to handle requests for any user associated with any organization that is a tenant. Because it is desirable to be able to add and remove application servers from the server pool at any time for any reason, there is preferably no server affinity for a user and/or organization to a specific application server 1022. In one embodiment, therefore, an interface system implementing a load balancing function (e.g., an F5 Big-IP load balancer) is communicably coupled between the application servers 1022 and the user systems 1020 to distribute requests to the application servers 1022. In one embodiment, the load balancer uses a least connections algorithm to route user requests to the application servers 1022. Other examples of load balancing algorithms, such as round robin and observed response time, also can be used. For example, in certain embodiments, three consecutive requests from the same user may hit three different application servers 1022, and three requests from different users may hit the same application server 1022. In this manner, system 1002 is multi-tenant, in which system 1002 handles storage of, and access to, different objects, data and applications across disparate users and organizations.

As an example of storage, one tenant might be a company that employs a sales force where each salesperson uses system 1002 to manage their sales process. Thus, a user might maintain contact data, leads data, customer follow-up data, performance data, goals and progress data, etc., all applicable to that user's personal sales process (e.g., in tenant data storage 1004). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1002 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1002 might also maintain system level data usable by multiple tenants or other data. Such system level data might include industry reports, news, postings, and the like that are sharable among tenants.

In certain embodiments, user systems 1020 (which may be client systems) communicate with application servers 1022 to request and update system-level and tenant-level data from system 1002 that may require sending one or more queries to tenant data storage 1004 and/or system data storage 1006. System 1002 (e.g., an application server 1022 in system 1002) automatically generates one or more SQL statements (e.g., one or more SQL queries) that are designed to access the desired information. System data storage 1006 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com® customer relationship manager) of a user device (such as user system 122_1 in FIG. 1) or an organization's representative, such as a salesperson, a sales manager, a product manager, an accountant, a director, an owner, a president, a system administrator, a computer programmer, an information technology ("IT") representative, etc.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com® developer platform, Salesforce1® mobile container, Apex™ code, JavaScript™ code, jQuery™ library, Developerforce™ library, Visualforce™ framework, Service Cloud Console Integration Toolkit™ ("Integration Toolkit" or "Toolkit") toolkit, Platform on a Service™ ("PaaS") service, Chatter® Groups communication tool, Sprint Planner® events, MS Project® events, etc.), web domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Figure 11:
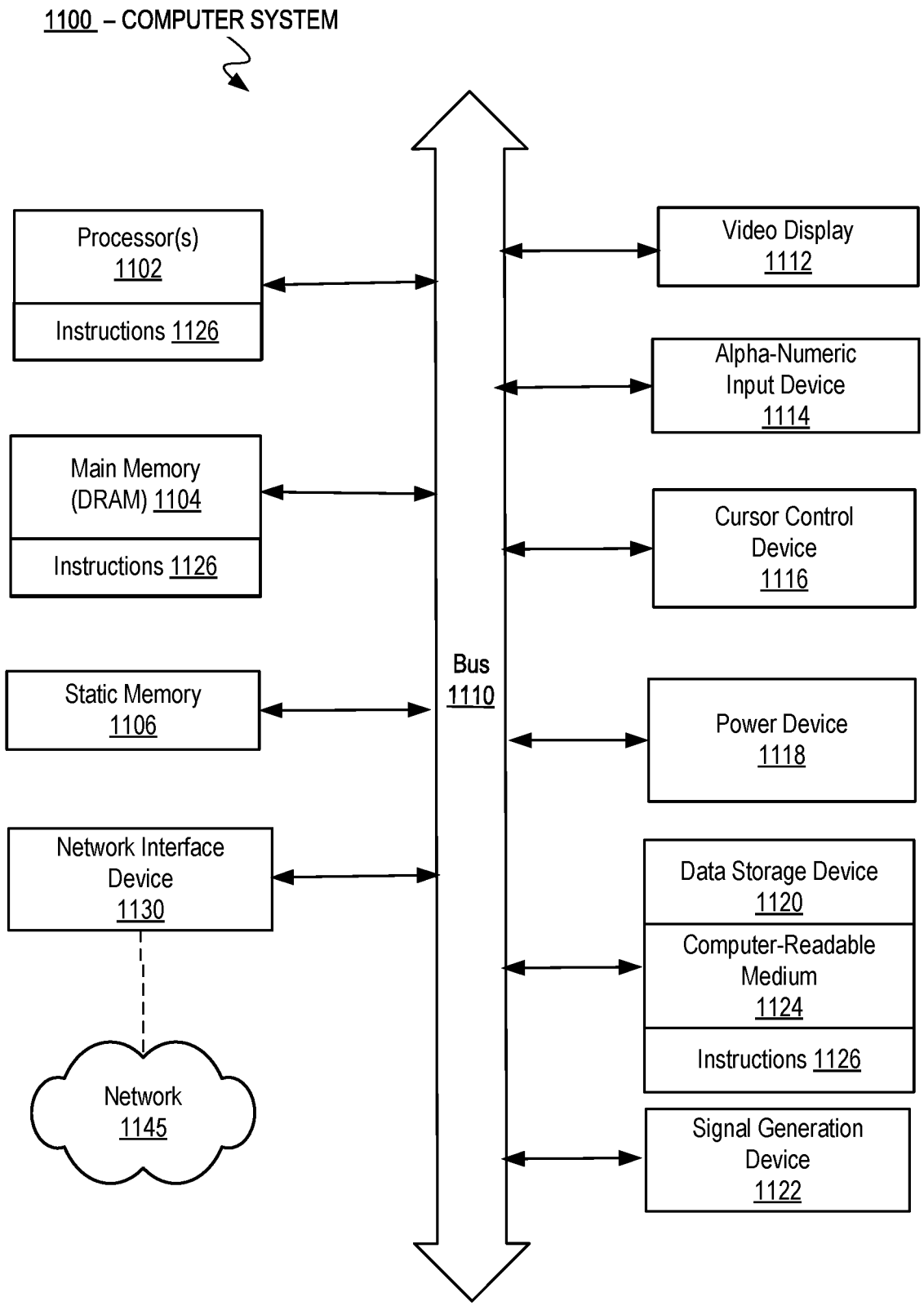
FIG. 11 is a block diagram illustrating a machine in the exemplary form of a general computer system within which one or more implementations of a disk storage space management system can be carried out.

FIG. 11 illustrates a diagrammatic representation of a machine in the exemplary form of a computer system 1100 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 1100 may be utilized by or illustrative of any of the electronic components described herein (e.g., any of the components illustrated in or described with respect to FIGS. 1, 2 and 10A-10B).

The exemplary computer system 1100 includes a processing device (processor) 1102, a main memory 1104 (e.g., ROM, flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1120, which communicate with each other via a bus 1110.

Processor 1102 represents one or more general-purpose processing devices such as a microprocessor, central processing unit, or the like. More particularly, processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute instructions 1126 for performing the operations and steps discussed herein. Processor 1102 may have one or more processing cores.

Computer system 1100 may further include a network interface device 1130. Computer system 1100 also may include a video display unit 1112 (e.g., a liquid crystal display (LCD), a cathode ray tube (CRT), or a touch screen), an alphanumeric input device 1114 (e.g., a keyboard), a cursor control device 1116 (e.g., a mouse or touch screen), and a signal generation device 1122 (e.g., a loud speaker).

Power device 1118 may monitor a power level of a battery used to power computer system 1100 or one or more of its components. Power device 1118 may provide one or more interfaces to provide an indication of a power level, a time window remaining prior to shutdown of computer system 1100 or one or more of its components, a power consumption rate, an indicator of whether computer system is utilizing an external power source or battery power, and other power related information. In some implementations, indications related to power device 1118 may be accessible remotely (e.g., accessible to a remote back-up management module via a network connection). In some implementations, a battery utilized by power device 1118 may be an uninterruptable power supply (UPS) local to or remote from computer system 1100. In such implementations, power device 1118 may provide information about a power level of the UPS.

Data storage device 1120 may include a computer-readable storage medium 1124 (e.g., a non-transitory computer-readable storage medium) on which is stored one or more sets of instructions 1126 (e.g., software) embodying any one or more of the methodologies or functions described herein. Instructions 1126 may also reside, completely or at least partially, within main memory 1104 and/or within processor 1102 during execution thereof by computer system 1100, main memory 1104, and processor 1102 also constituting computer-readable storage media. Instructions 1126 may further be transmitted or received over a network 1145 via network interface device 1130.

In one implementation, instructions 1126 include instructions for performing any of the implementations described herein. While computer-readable storage medium 1124 is shown in an exemplary implementation to be a single medium, it is to be understood that computer-readable storage medium 1124 may include a single medium or multiple media (e.g., a centralized or distributed database, and/or associated caches and servers) that store the one or more sets of instructions.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system for disk storage space management comprising:
   a repository to store:
      an inventory of disk storage servers to provide disk storage space to disk storage consumers, and
      a policy to manage the disk storage space provided to the disk storage consumers;
   a processor to:
      collect usage statistics for usage of disk storage space provided to the disk storage consumers, wherein the usage statistics include server usage statistics collected from the disk storage servers, the server usage statistics including a time-to-live for each of the disk storage servers; and
      evaluate the usage statistics against the policy; and
   a job queue in which to queue jobs to manage the disk storage space in response to the usage statistics evaluated against the policy, a job including any one or more of:
      a modification to write traffic originating from a disk storage consumer to one or more of the disk storage servers, and
      a space management request to any one or more of the disk storage servers and the disk storage consumers, the space management request including a request to any one or more of create, move, write, remove and modify a consumer storage bucket maintained on behalf of a disk storage consumer in one or more of the disk storage servers.

2. The system of claim 1, wherein the server usage statistics include any one or more of: a storage capacity of each of the disk storage servers; and a used amount of the storage capacity.

3. The system of claim 2, wherein:
   to evaluate the server usage statistics includes to evaluate the server usage statistics against a space threshold specified in the policy, the processor to:
   compute an available space remaining for a disk storage server from the used amount of the storage capacity, and
   determine the available space for the disk storage server is any one of more or less than the space threshold; and
   the modification to write traffic to:
      cause the disk storage server whose available space is less than the space threshold to redirect write traffic to the disk storage server whose available space is more than the space threshold, and
      cause the disk storage server whose available space is more than the space threshold to accept redirected write traffic.

4. The system of claim 3, wherein the modification to write traffic to cause the disk storage server whose available space is more than the space threshold to:
   accept write traffic from one or more of the disk storage consumers; and accept one or more consumer storage buckets from disk storage servers whose available space is less than the space threshold.

5. The system of claim 2, wherein to evaluate the server usage statistics against the policy, the processor to:
compute a total of the time-to-live collected from the disk storage servers; and
issue a capacity alert if the total of the time-to-live is less than a lead time specified in the policy to replace the disk storage servers.

6. The system of claim 2, wherein the usage statistics include consumer usage statistics collected from the disk storage servers, the consumer usage statistics including any one or more of:
a consumer used amount representing the used amount of the storage capacity per disk storage consumer,
an ingestion rate for the consumer storage bucket, and
a list of artifacts associated with the consumer storage bucket.

7. The system of claim 6, wherein to evaluate the consumer usage statistics includes to evaluate the consumer usage statistics against a consumer space threshold specified in the policy, the processor to evaluate whether any one or more of:
the consumer used amount exceeds the consumer space threshold;
the ingestion rate for one or more consumer storage buckets indicates the consumer used amount will exceed the consumer space threshold within a time threshold specified in the policy; and
the list of artifacts associated with one or more consumer storage buckets indicates the consumer used amount will exceed the consumer space threshold within the time threshold specified in the policy.

8. The system of claim 7, wherein:
the space management request is queued to the job queue responsive to the processor having evaluated the consumer used amount exceeds the consumer space threshold; and
the space management request causes a space management action in a disk storage server whose available space is more than the space threshold to any one or more of:
create a new consumer storage bucket for one or more disk storage consumers,
accept one or more consumer storage buckets moved from one or more disk storage servers whose available space is less than the space threshold, and
delete any artifacts in the list of artifacts from the consumer storage buckets that were moved.

9. The system of claim 8, wherein the space management request causes a space management action in a disk storage consumer whose consumer used amount exceeds the consumer space threshold to direct write traffic to the one or more disk storage servers where the consumer storage buckets were any one of created and moved.

10. The system of claim 1, wherein the consumer storage bucket comprises any of object storage and file storage.

11. The system of claim 1, wherein:
the inventory of disk storage servers to include a network identifier of a disk storage server, and
to collect usage statistics includes to identify the disk storage server that provided the disk storage space to the disk storage consumers by the network identifier.

12. The system of claim 1, further comprising:
an application server in communication with the job queue, the application server associated with a disk storage consumer; and
wherein to queue the job includes to queue the job for execution on the application server.

13. A computer-implemented method of disk storage space management comprising:
a processor in communication with disk storage servers providing disk storage space to disk storage consumers, the processor performing logic for:
receiving a policy for managing the disk storage space provided to the disk storage consumers,
storing an inventory of the disk storage servers,
managing the disk storage space in accordance with the policy, including:
collecting usage statistics for usage of disk storage space provided to the disk storage consumers, wherein the usage statistics include server usage statistics collected from the disk storage servers, the server usage statistics including a time-to-live for each of the disk storage servers;
evaluating the usage statistics against the policy, and
queuing jobs to manage the disk storage space in response to the usage statistics evaluated against the policy, a job including any one or more of:
a modification to write traffic originating from a disk storage consumer to one or more of the disk storage servers, and
a space management request to any one or more of the disk storage servers and the disk storage consumers, the space management request including a request to any one or more of create, move, write, remove and modify a consumer storage bucket maintained on behalf of a disk storage consumer in one or more of the disk storage servers.

14. The computer-implemented method of claim 13, wherein the server usage statistics include any one or more of:
a storage capacity of each of the disk storage servers; and
a used amount of the storage capacity.

15. The computer-implemented method of claim 14, wherein evaluating the server usage statistics includes evaluating the server usage statistics against a space threshold specified in the policy, the processor performing logic for:
computing an available space remaining for a disk storage server from the used amount of the storage capacity, and
determining the available space for the disk storage server is any one of more or less than the space threshold; and
wherein the modification to write traffic includes any one or more modifications to:
cause the disk storage server whose available space is less than the space threshold to redirect write traffic to the disk storage server whose available space is more than the space threshold, and
cause the disk storage server whose available space is more than the space threshold to accept redirected write traffic.

16. The computer-implemented method of claim 15, wherein to cause the disk storage server whose available space is more than the space threshold, the modification to write traffic further includes any one or more modifications to:
accept write traffic from one or more of the disk storage consumers; and accept one or more consumer storage buckets from disk storage servers whose available space is less than the space threshold.

17. The computer-implemented method of claim 14, wherein evaluating the server usage statistics against the policy, the processor further performing logic for:
computing a total of the time-to-live collected from the disk storage servers; and
issuing a capacity alert if the total of the time-to-live is less than a lead time specified in the policy to replace the disk storage servers.

18. The computer-implemented method of claim 14, wherein the usage statistics include consumer usage statistics collected from the disk storage servers, the consumer usage statistics including any one or more of:
a consumer used amount representing the used amount of the storage capacity per disk storage consumer;
an ingestion rate for the consumer storage bucket; and
a list of artifacts associated with the consumer storage bucket.

19. The computer-implemented method of claim 18, wherein evaluating the consumer usage statistics includes evaluating the consumer usage statistics against a consumer space threshold specified in the policy, the processor further performing logic for evaluating whether any one or more of:
the consumer used amount exceeds the consumer space threshold;
the ingestion rate for one or more consumer storage buckets indicates the consumer used amount will exceed the consumer space threshold within a time threshold specified in the policy; and
the list of artifacts associated with one or more consumer storage buckets indicates the consumer used amount will exceed the consumer space threshold within the time threshold specified in the policy.

20. The computer-implemented method of claim 19, the processor further performing logic for:
queuing the space management request responsive to the processor having evaluated the consumer used amount exceeds the consumer space threshold; and
wherein the space management request queued to a disk storage server whose available space is more than the space threshold includes a space management action for any one or more of:
creating a new consumer storage bucket for one or more disk storage consumers,
accepting one or more consumer storage buckets moved from one or more disk storage servers whose available space is less than the space threshold, and
deleting any artifacts in the list of artifacts from the consumer storage buckets that were moved.

21. The computer-implemented method of claim 20, wherein the space management request queued to a disk storage consumer whose consumer used amount exceeds the consumer space threshold includes a space management action for directing write traffic to the one or more disk storage servers where the consumer storage buckets were any one of created and moved.

22. The computer-implemented method of claim 13, wherein the consumer storage bucket comprises any of object storage and file storage.

23. The computer-implemented method of claim 13, wherein:
storing an inventory of the disk storage servers includes storing a network identifier of a disk storage server; and
collecting usage statistics includes identifying the disk storage server that provided the disk storage space to the disk storage consumers by the network identifier.

24. The computer-implemented method of claim 13, wherein:
the processor is in communication with an application server; and
the logic for queuing jobs to manage the disk storage space in response to the usage statistics evaluated against the policy includes logic for queueing the jobs for execution on the application server associated with a disk storage consumer.

25. At least one tangible, non-transitory computer-readable storage medium having instructions encoded thereon which, when executed by a processing device in a computing platform of disk storage servers providing disk storage space to disk storage consumers, cause the processing device to:
receive a policy for managing disk storage space provided to the disk storage consumers;
store an inventory of the disk storage servers; and
manage disk storage space in accordance with the policy, including to:
collect usage statistics for usage of disk storage space provided to the disk storage consumers, wherein the usage statistics include server usage statistics collected from the disk storage servers, the server usage statistics including a time-to-live for each of the disk storage servers; and
evaluate the usage statistics against the policy,
queue jobs to manage disk storage space in response to the usage statistics evaluated against the policy, a job including instructions to cause the processing device to any one or more of:
modify write traffic originating from a disk storage consumer to one or more of the disk storage servers, and
generate a space management request to any one or more of the disk storage servers and the disk storage consumers, the space management request including a request to any one or more of create, move, write, remove and modify a consumer storage bucket maintained on behalf of a disk storage consumer in one or more of the disk storage servers.

* * * * *